(12) United States Patent
Englebright et al.

(10) Patent No.: US 11,713,783 B2
(45) Date of Patent: Aug. 1, 2023

(54) GREASE BOOT FOR A BALL JOINT

(71) Applicant: FEDERAL-MOGUL MOTORPARTS LLC, Southfield, MI (US)

(72) Inventors: Seth Englebright, Festus, MO (US); Sean Smith, Wentzville, MO (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 32 days.

(21) Appl. No.: 17/383,656

(22) Filed: Jul. 23, 2021

(65) Prior Publication Data
US 2023/0028577 A1 Jan. 26, 2023

(51) Int. Cl.
*F16C 11/06* (2006.01)

(52) U.S. Cl.
CPC ........ *F16C 11/068* (2013.01); *F16C 11/0671* (2013.01); *Y10T 403/315* (2015.01); *Y10T 403/32729* (2015.01)

(58) Field of Classification Search
CPC .............. F16C 11/0666; F16C 11/0671; F16C 11/0676; F16C 11/068; F16J 3/042; F16J 3/045; F16J 3/046; F16J 3/048; Y10T 403/31; Y10T 403/315; Y10T 403/32729
USPC ............ 277/634, 635, 636; 403/50, 51, 134; 464/173, 174, 175
See application file for complete search history.

(56) References Cited

U.S. PATENT DOCUMENTS

| | | | | |
|---|---|---|---|---|
| 3,248,955 A | * | 5/1966 | Templeton | F16C 11/0671 403/50 |
| 3,389,927 A | * | 6/1968 | Herbenar | F16C 11/0671 403/51 |
| 3,901,518 A | * | 8/1975 | Uchida | F16C 11/0671 403/134 |
| 4,121,844 A | * | 10/1978 | Nemoto | F16C 11/0671 403/134 |
| 4,322,175 A | * | 3/1982 | Szczesny | F16C 11/0671 403/134 |
| 5,066,159 A | * | 11/1991 | Urbach | F16C 11/0671 403/134 |
| 5,100,254 A | * | 3/1992 | Wasada | F16C 11/0671 403/134 |
| 5,466,084 A | * | 11/1995 | Brueggen | F16C 11/0671 403/134 |
| 5,649,779 A | * | 7/1997 | Martin | F16C 11/0671 403/134 |
| 5,653,545 A | | 8/1997 | Moormann et al. | |

(Continued)

FOREIGN PATENT DOCUMENTS

| | | | | |
|---|---|---|---|---|
| DE | 4209646 A1 | * | 9/1993 | ............... F16J 3/042 |
| DE | 10160989 A1 | * | 6/2003 | .......... F16C 11/0671 |

(Continued)

*Primary Examiner* — Josh Skroupa
(74) *Attorney, Agent, or Firm* — Reising Ethington, P.C.

(57) ABSTRACT

A ball joint includes a grease boot having a snap ring at least partially embedded in an elastomeric body. The snap ring has a C-shaped body that defines a compressible radial gap in the elastomeric body. The snap ring can be at least partially embedded in a flange of the grease boot, with a radially outermost edge of the flange including a first elastomeric shoulder, a second elastomeric shoulder, and an exposed outer wall of the snap ring located between the first elastomeric shoulder and the second elastomeric shoulder.

16 Claims, 2 Drawing Sheets

(56) References Cited

U.S. PATENT DOCUMENTS

| | | | | |
|---|---|---|---|---|
| 5,855,448 A * | 1/1999 | Showalter | | F16C 11/0671 403/134 |
| 6,010,271 A * | 1/2000 | Jackson | | F16C 11/0628 403/132 |
| 6,502,831 B2 * | 1/2003 | Jarrus | | F16C 11/0671 403/134 |
| 6,561,716 B1 * | 5/2003 | Suzuki | | F16C 11/0685 403/131 |
| 6,582,146 B2 * | 6/2003 | Raymoure | | F16C 11/0671 403/51 |
| 6,773,197 B2 * | 8/2004 | Urbach | | F16C 11/0671 403/135 |
| 7,070,355 B2 * | 7/2006 | Abels | | F16C 11/0671 403/50 |
| 7,510,344 B2 * | 3/2009 | Kondoh | | F16C 11/0671 403/135 |
| 7,704,007 B2 * | 4/2010 | Elterman | | F16C 11/0671 403/134 |
| 7,931,279 B2 * | 4/2011 | Niwa | | F16J 3/042 277/630 |
| 7,980,564 B2 * | 7/2011 | Niwa | | F16C 11/0671 277/634 |
| 9,790,983 B2 * | 10/2017 | Kopsie | | F16C 11/0671 |
| 9,850,940 B2 * | 12/2017 | Yanagi | | F16C 11/0671 |
| 9,863,464 B2 * | 1/2018 | Hosen | | F16C 11/0671 |
| 10,041,530 B2 | 8/2018 | Kanagawa | | |
| 10,294,983 B2 * | 5/2019 | Parker | | F16C 11/0642 |
| 10,359,071 B2 | 7/2019 | Parker | | |
| 10,473,148 B2 * | 11/2019 | Doherty | | F16C 11/0671 |
| 10,844,899 B2 | 11/2020 | Walter et al. | | |
| 11,231,066 B2 * | 1/2022 | Jiang | | F16C 11/0671 |
| 11,415,222 B2 * | 8/2022 | Idies | | F16C 11/0671 |
| 2003/0081989 A1 * | 5/2003 | Kondoh | | F16C 11/0671 403/135 |
| 2004/0217554 A1 * | 11/2004 | Abels | | F16C 11/0671 277/634 |
| 2009/0047063 A1 * | 2/2009 | Shirai | | F16C 11/0671 403/135 |
| 2016/0053804 A1 * | 2/2016 | Iwasaka | | F16C 11/0671 403/134 |
| 2018/0372148 A1 * | 12/2018 | Hirota | | F16C 11/0671 |
| 2021/0033141 A1 * | 2/2021 | Sato | | F16C 11/0671 |

FOREIGN PATENT DOCUMENTS

| | | | | |
|---|---|---|---|---|
| DE | 102006039861 A1 * | 3/2008 | | F16C 11/0671 |
| DE | 102009042936 A1 * | 4/2010 | | F16C 11/0671 |
| DE | 102011106830 A1 * | 3/2012 | | F16C 11/0676 |
| DE | 102018000128 A1 * | 7/2019 | | F16C 11/0671 |
| EP | 0818634 A2 | 1/1998 | | |
| EP | 1069024 A1 * | 1/2001 | | F16C 11/0671 |
| EP | 1416175 A2 | 5/2004 | | |
| EP | 1420178 A2 | 5/2004 | | |
| EP | 2711593 A1 * | 3/2014 | | F16C 11/0666 |
| JP | 2013160327 A * | 8/2013 | | F16C 11/0671 |
| JP | 2013160327 A | 8/2013 | | |

\* cited by examiner

GREASE BOOT FOR A BALL JOINT

TECHNICAL FIELD

This invention generally relates to vehicle components and, in particular, to grease boots and ball joints used in steering and suspension systems.

BACKGROUND

Grease boots for ball joints can include one or more locking rings to help facilitate part closure. Oftentimes, these locking ring assemblies require the use of multiple components to close the part after assembly while providing boot function. Further, the configuration of the locking ring may not be optimized to promote sealing of the housing. Providing a more integrated grease boot closure solution while promoting easy installation and improved sealing is desirable.

SUMMARY

According to one embodiment, there is provided a grease boot comprising an elastomeric body, and a snap ring that is at least partially embedded in the elastomeric body. The snap ring has a C-shaped body that defines a compressible radial gap in the elastomeric body, wherein the C-shaped body includes one or more through holes for interlocking the snap ring with the elastomeric body.

In some embodiments, the elastomeric body includes an axially extending sleeve extending between a housing attachment end and a stud attachment end, the elastomeric body having a flange located toward the housing attachment end.

In some embodiments, a radially outermost edge of the flange includes a first elastomeric shoulder, a second elastomeric shoulder, and an exposed outer wall of the snap ring located between the first elastomeric shoulder and the second elastomeric shoulder.

In some embodiments, the flange is configured to seat in variably dimensioned radially extending grooves.

In some embodiments, the compressible radial gap is configured to close by 90% or more in size upon installation of the grease boot into a housing of a ball joint.

In some embodiments, the snap ring is made of a metal-based material and the elastomeric body is made of a polyurethane-based material.

In some embodiments, the grease boot is installed in ball joint, and the snap ring is at least partially embedded in a flange in the elastomeric body, and the flange is seated in a radially extending groove in an internal bore of a housing.

In some embodiments, a height of the radially extending groove is smaller than an uninstalled thickness of the flange.

According to another embodiment, there is provided a grease boot comprising an elastomeric body having an axially extending sleeve extending between a housing attachment end and a stud attachment end. The elastomeric body includes a flange located toward the housing attachment end. The grease boot includes a snap ring that is at least partially embedded in the flange. A radially outermost edge of the flange includes a first elastomeric shoulder, a second elastomeric shoulder, and an exposed outer wall of the snap ring located between the first elastomeric shoulder and the second elastomeric shoulder.

In some embodiments, the snap ring has a C-shaped body that defines a compressible radial gap in the elastomeric body.

In some embodiments, the compressible radial gap is configured to close by 90% or more in size upon installation of the grease boot into a housing of a ball joint.

In some embodiments, the C-shaped body includes one or more through holes for interlocking the snap ring with the elastomeric body.

In some embodiments, the grease boot is installed in a ball joint, and the flange is seated in a radially extending groove in an internal bore of a housing.

In some embodiments, a height of the radially extending groove is smaller than an uninstalled thickness of the flange.

According to another embodiment, there is provided a ball joint comprising a ball; a stud extending from the ball; a grease boot at least partially surrounding the stud, the grease boot having a snap ring at least partially embedded in an elastomeric body; and a housing at least partially surrounding the ball. The housing has an internal bore, a chamfered receiving end, and a radially extending groove in the internal bore toward the chamfered receiving end. The snap ring is at least partially seated in the radially extending groove in the internal bore of the housing.

In some embodiments, the snap ring has a C-shaped body that defines a compressible radial gap in the elastomeric body.

In some embodiments, the compressible radial gap is configured to close by 90% or more in size upon installation of the grease boot into a housing of a ball joint.

In some embodiments, the C-shaped body includes one or more through holes for interlocking the snap ring with the elastomeric body.

In some embodiments, the elastomeric body includes an axially extending sleeve extending between a housing attachment end and a stud attachment end, the elastomeric body having a flange located toward the housing attachment end.

In some embodiments, a radially outermost edge of the flange includes a first elastomeric shoulder, a second elastomeric shoulder, and an exposed outer wall of the snap ring located between the first elastomeric shoulder and the second elastomeric shoulder.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The ball joint and grease boot described herein allow for improved installation and sealing of the internal components of the ball joint. The grease boot includes an elastomeric body with an integrated snap ring that can be compressed and then installed into a radially extending groove in the ball joint housing. Typically, ball joints require multiple components to close the part after assembly and provide the requisite boot function. As described herein, particularly with respect to parts that have low axial loading, the components can be strategically combined to help streamline manufacture and enhance sealing on the closed part. An integral grease boot with the embedded closure snap ring feature can decrease the number of installed parts, and the snap ring is strong enough to retain the boot and prevent the stud from being pulled from the housing under moderate force.

Figure 1:
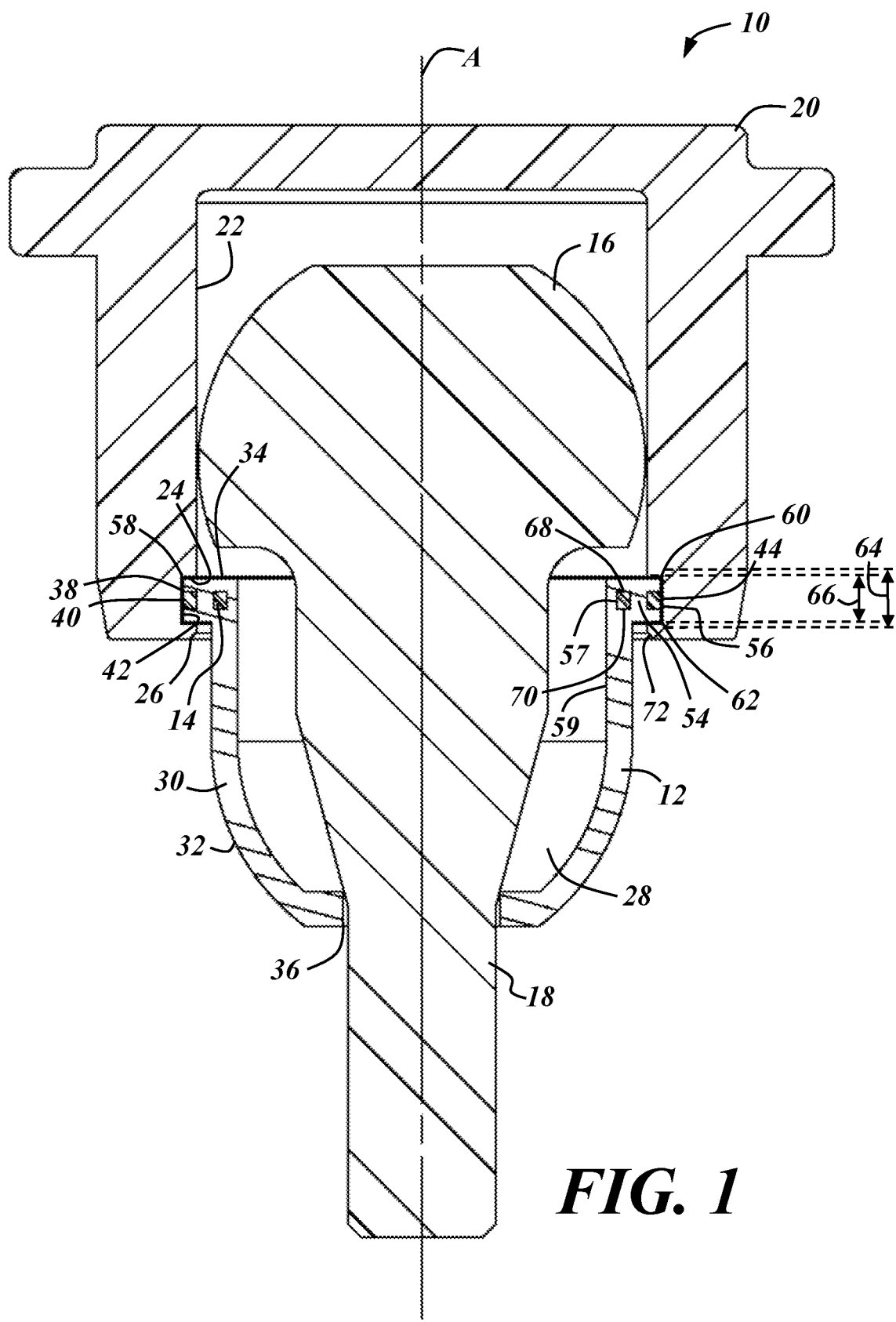
FIG. 1 is a cross-section view of a ball joint having a grease boot according to one embodiment.

FIG. 1 illustrates one embodiment of a ball joint 10 having a grease boot 12 with a partially embedded snap ring 14. The ball joint 10 can be installed in any operable steering or suspension component, and it is advantageously used in radial and compression loaded parts, due to the moderate tensile force capability of the snap ring 14. However, it is possible to manufacture alternately configured suspension and/or steering components in accordance with the teachings herein. For example, the ball joint 10 may include any moveable socket configuration and is not limited to the explicitly illustrated ball joint shown in FIG. 1 and described herein. Additionally, the overall shape and configuration of the ball joint 10 and/or grease boot 12 may vary depending on the desired implementation. Further, the ball joint 10 and/or the grease boot 12 may also include other features beyond what is specifically illustrated, such as a bearing, grease fitting, etc., or other operational-based features depending on the desired use and placement of the joint.

The ball joint 10 includes a ball 16 and a stud 18 extending from the ball. A housing 20 at least partially surrounds the ball 22 such that the ball is situated within an internal bore 22 of the housing. The internal bore 22 includes a radially extending groove 24 toward a chamfered receiving end 26, which help when seating the grease boot 12. One advantage of the grease boot configuration is that it allows for the use of a closed housing 20, although the grease boot 12 could be used with alternately configured housings. This can simplify manufacture, reduce the number of parts, and reduce the cost of the ball joint 10. Moreover, it is possible for the ball joint 10, and more particularly, the grease boot 12 and/or housing 20, to have various threads, grooves, projecting portions, etc., that are not particularly illustrated in the figures and will likely depend on the desired implementation for the ball joint 10.

The grease boot 12 helps encapsulate an internal area 28 for housing lubricant around the ball 16 and stud 18. The grease boot 12 is comprised of an elastomeric body 30 having an axially extending sleeve 32 that extends between a housing attachment end 34 and a stud attachment end 36. The elastomeric body 30 is comprised of a polyurethane-based material such as Neoprene, but any operable rubber or rubber-like material can be used to help seal the internal area 28, while providing enough flexibility to maintain requisite tolerance and movement of the ball and stud assembly 16, 28.

The housing attachment end 34 and the stud attachment end 36 of the grease boot 12 are concentrically arranged with respect to the axis A so as to surround the stud 18. At the housing attachment end 34, a flange 38 projects radially outward away from the axis A and serves to seat and seal the grease boot 12 in the radially extending groove 24 of the housing 20. The three-sided wall configuration of the flange 38 generally matches the three-sided wall configuration of the radially extending groove 24, to provide a sealing engagement between the boot 12 and the housing 20. An axially extending outer wall 40 of the flange 38 directly interfaces with an axially extending inner wall 42 of the radially extending groove 24. This arrangement can help provide a tighter seal, but it is possible to alternately configure the flange 38 with respect to the groove 24.

The flange 38 includes a strategically arranged snap ring 14, which can help streamline manufacture and improve sealing. The snap ring 14 is partially embedded, which can provide advantages over some fully embedded inserts that are more typically arranged between the boot 12 and the housing 20. As detailed more fully below, an exposed outer wall 44 of the snap ring 14 is situated along the axially extending outer wall 40 of the flange 38, which can improve installation by providing a more rigid edge that is less prone to shearing.

Figure 2:
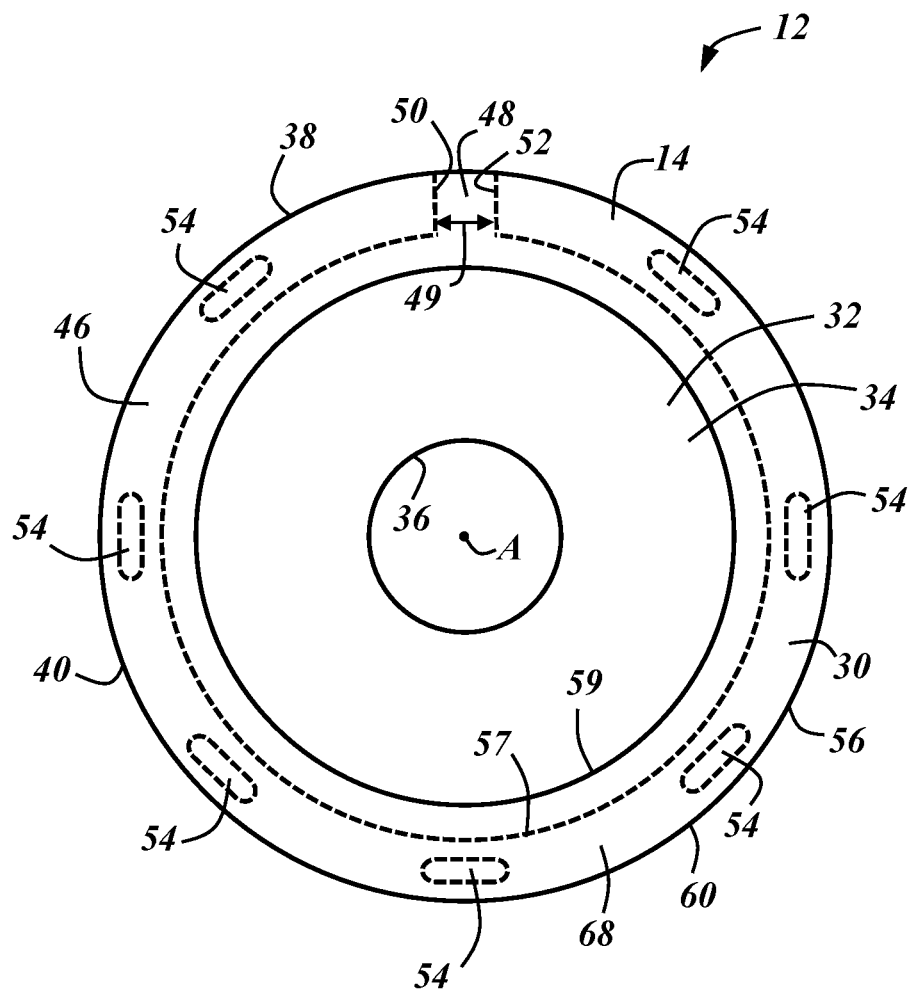
FIG. 2 is a top view of the grease boot of the ball joint of FIG. 1.

The snap ring 14 has a C-shaped body 46, as schematically shown in the top view of the grease boot 12 in FIG. 2. The C-shaped body 46 is advantageously made of a metal-based material such as spring steel, and its shape defines a compressible radial gap 48 in the flange 38 of the elastomeric body 30. The compressible radial gap 48 is configured to close by 90% or more in size upon installation of the boot 12 with the housing 20. Closing this amount, or even completely closing so that a first end 50 and a second end 52 of the C-shaped body 46 are co-aligned or overlap before installation, can allow for quicker installation and a better fit as the snap ring 14 expands radially into the radially extending groove 24.

The C-shaped body 46 includes a plurality of through holes 54 to interlock the snap ring 14 with the elastomeric body 30. The snap ring 14 is preferably insert-molded or otherwise integrally bonded with the elastomeric body 30. This part integration can streamline manufacture of the ball joint 10. When embedding the snap ring 14 within the flange 38 of the elastomeric body 30, the through holes 54 fill with the elastomeric material and help bond the body and the ring together. The C-shaped body 46 preferably includes between five and ten through holes 54 that are circumferentially spaced around the body, leaving enough space and material between the through holes to maintain requisite rigidity of the ring 14. Including more through holes 54 can help with retention, but this should be balanced with the need for sufficient spring back force, as providing less through holes results in greater spring force to seat the flange 38 into place. Other configurations, distributions, etc. for the through holes 54 are certainly possible.

The C-shaped body 46 can be strategically positioned within the flange 38 to help with sealing, while minimizing shearing of the axially extending outer wall 40. Advantageously, an exposed outer wall 56 of the snap ring 14 is situated along the axially extending outer wall 40 of the flange 38. This locates the exposed outer wall 56 at the radially outermost edge 58 of the flange 38, away from the axis A. This configuration can help the bond between the boot 12 and the housing 20, as it locates a larger portion of the snap ring 14 within the radially extending groove 24. Further, having a metal-based material along the radially outermost edge 58 can help reduce shearing of the axially extending outer wall 40 upon installation of the boot 12. This configuration also spaces an internal wall 57 of the C-shaped body 46 of the snap ring 14 from an internal wall 59 of the boot 12. This can help minimize the risk of grease leaks from the internal area 28 by locating the embedded component of the flange 38 radially outward instead of interfacing with the internal wall 59.

The radially outermost edge 58 of the flange 38 includes the snap ring 14 sandwiched between a first elastomeric shoulder 60 and a second elastomeric shoulder 62. The first and second elastomeric shoulders 60, 62 serve as the corner points of the flange 38 and help to axially shield the snap ring 14 within the radially extending groove 24. This arrangement can improve the seal between the boot 12 and the housing 20, particularly when there is more axial play of the stud 18. Furthermore, having the elastomeric shoulders 60, 62 provides for compressible regions within the flange 38 such that an uninstalled thickness 64 of the flange is greater than a height 66 of the radially extending groove 24. This arrangement also helps improve the seal between the boot 12 and the housing 20. Moreover, this arrangement allows for the boot 12 to be used in variably dimensioned grooves in different housings, as the height 66 of the groove 24 does not need to precisely match the thickness 64 of the flange 38 for adequate accommodation. In one preferred example, the groove height 66 is 5-10% less than the uninstalled thickness 64 of the flange 38. This relationship helps with seating and sealing, but may be varied depending on the design and functional requirements for the joint 10.

The exposed outer wall 44 of the snap ring 14 at the radially outermost edge 58 makes up about 50% to 60% of the thickness 64 of the flange 38, with the elastomeric shoulders 60, 62 making up about 20% to 25%, respectively, of the remaining thickness. This centrally locates the snap ring 14 into the flange 38, and creates compressible regions on each axially facing side 68, 70 of the snap ring 14. These size variations may depend ultimately on the structure of the ball joint 10. For example, a more traditional ball joint may require a stronger, thicker snap ring 14 than the illustrated ball joint, which allows for some axial movement of the stud 18. This axial movement can help compensate for manufacturing variances in the tolerance of the axle and knuckle ears.

Upon installation, the flange 38 can be circumferentially compressed so as to close the compressible radial gap 48, and the grease boot 12 can be inserted into the internal bore 22 of the housing 20. The chamfered receiving end 26 is situated adjacent the radially extending groove 24, with a small portion of the internal bore 22 located between the chamfer 72 and the radially extending groove 24. This creates a ramped entry portion for the flange 38 at the chamfer 72, and then having the non-chamfered portion of the internal bore 22 can help improve retention by creating a groove 24 with greater radial depth. When the boot 12 needs to be removed from the joint 10, if the stud 18 is to be replaced for example, the flange 38 can be circumferentially compressed to allow for removal of the boot 12.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A grease boot, comprising:
an elastomeric body; and
a snap ring that is at least partially embedded in the elastomeric body, wherein the snap ring has a C-shaped body that defines a compressible radial gap in the elastomeric body, wherein the C-shaped body includes one or more through holes for interlocking the snap ring with the elastomeric body, wherein each through hole is wholly surrounded by a material of the C-shaped body, wherein the elastomeric body includes an axially extending sleeve extending between a housing attachment end and a stud attachment end, the elastomeric body having a flange located toward the housing attachment end, and wherein a radially outermost edge of the flange includes a first elastomeric shoulder, a second elastomeric shoulder, and an exposed outer wall of the snap ring located between the first elastomeric shoulder and the second elastomeric shoulder.

2. The grease boot of claim 1, wherein the flange is configured to seat in variably dimensioned radially extending grooves.

3. The grease boot of claim 1, wherein the compressible radial gap is configured to by close 90% or more in size upon installation of the grease boot into a housing of a ball joint.

4. The grease boot of claim 1, wherein the snap ring is made of a metal-based material and the elastomeric body is made of a polyurethane-based material.

5. A ball joint, comprising the grease boot of claim 1, wherein the snap ring is at least partially embedded in a flange in the elastomeric body, and the flange is seated in a radially extending groove in an internal bore of a housing.

6. The ball joint of claim 5, wherein a height of the radially extending groove is smaller than an uninstalled thickness of the flange.

7. A grease boot, comprising:
an elastomeric body having an axially extending sleeve extending between a housing attachment end and a stud attachment end, the elastomeric body having a flange located toward the housing attachment end; and
a snap ring that is at least partially embedded in the flange, wherein a radially outermost edge of the flange includes a first elastomeric shoulder, a second elastomeric shoulder, and an exposed outer wall of the snap ring located between the first elastomeric shoulder and the second elastomeric shoulder.

8. The grease boot of claim 7, wherein the snap ring has a C-shaped body that defines a compressible radial gap in the elastomeric body.

9. The grease boot of claim 8, wherein the compressible radial gap is configured to close by 90% or more in size upon installation of the grease boot into a housing of a ball joint.

10. The grease boot of claim 8, wherein the C-shaped body includes one or more through holes for interlocking the snap ring with the elastomeric body.

11. A ball joint, comprising the grease boot of claim 7, wherein the flange is seated in a radially extending groove in an internal bore of a housing.

12. The ball joint of claim 11, wherein a height of the radially extending groove is smaller than an uninstalled thickness of the flange.

13. A ball joint, comprising:
- a ball;
- a stud extending from the ball;
- a grease boot at least partially surrounding the stud, the grease boot having a snap ring at least partially embedded in an elastomeric body, wherein the elastomeric body includes an axially extending sleeve extending between a housing attachment end and a stud attachment end, the elastomeric body having a flange located toward the housing attachment end, wherein a radially outermost edge of the flange includes a first elastomeric shoulder, a second elastomeric shoulder, and an exposed outer wall of the snap ring located between the first elastomeric shoulder and the second elastomeric shoulder; and
- a housing at least partially surrounding the ball, the housing having an internal bore, a chamfered receiving end, and a radially extending groove in the internal bore toward the chamfered receiving end, wherein the snap ring is at least partially seated in the radially extending groove in the internal bore of the housing.

14. The ball joint of claim 13, wherein the snap ring has a C-shaped body that defines a compressible radial gap in the elastomeric body.

15. The ball joint of claim 14, wherein the compressible radial gap is configured to close by 90% or more in size upon installation of the grease boot into a housing of a ball joint.

16. The ball joint of claim 14, wherein the C-shaped body includes one or more through holes for interlocking the snap ring with the elastomeric body.

* * * * *